United States Patent
Darwish

(10) Patent No.: US 8,243,587 B2
(45) Date of Patent: Aug. 14, 2012

(54) LABEL DISTRIBUTION PROTOCOL SYNCHRONIZATION IN MULTI-PROTOCOL LABEL SWITCHING ENVIRONMENTS

(75) Inventor: Ahmed Refaat M. Darwish, Reston, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 137 days.

(21) Appl. No.: 12/603,761

(22) Filed: Oct. 22, 2009

(65) Prior Publication Data

US 2011/0096780 A1   Apr. 28, 2011

(51) Int. Cl.
 *H04L 12/26* (2006.01)
(52) U.S. Cl. ........................................................ 370/217
(58) Field of Classification Search .......... 370/216–218, 370/221, 229–230.1, 235, 241, 242, 244, 370/248, 250, 252, 351, 389, 392
See application file for complete search history.

(56) References Cited

U.S. PATENT DOCUMENTS

| | | | | |
|---|---|---|---|---|
| 7,830,787 B1* | 11/2010 | Wijnands et al. | ............. | 370/218 |
| 2008/0101418 A1* | 5/2008 | Vasseur | ......................... | 370/503 |
| 2009/0274066 A1* | 11/2009 | Chen et al. | ..................... | 370/254 |
| 2011/0032828 A1* | 2/2011 | Scholl et al. | .................. | 370/242 |
| 2011/0044348 A1* | 2/2011 | Kini et al. | ..................... | 370/401 |

OTHER PUBLICATIONS

Juniper Networks, "Configuring LDP-IGP synchronization", JUNOSe 8.2x BGP and MPLS Configuration Guide, http://www.juniper.net/techpubs/software/erx/junose82/swconfig-bgp-mpls/html/mpls-config14.html, printed on Apr. 2, 2009, all pages.*
Juniper Networks, "Configuring LDP-IGP Synchronization", JUNOSe 8.2.x BGP and MPLS Configuration Guide, http://www.juniper.net/techpubs/software/erx/junose82/swconfig-bgp-mpls/html/mpls-config14.html, printed on Apr. 2, 2009, 3 pages.
Fang et al., "LED Failure Detection and Recovery", IEEE Communications Magazine, Oct. 2004, pp. 117-123.
Andersson et al., "IETF RFC 3036—LDP Specification", Jan. 2001, 75 pages.
Jork et al., "IETF RFC 5443—LDP IGP Synchronization", Mar. 2009, 7 pages.

* cited by examiner

*Primary Examiner* — Derrick Ferris
*Assistant Examiner* — Omar Ghowrwal

(57) ABSTRACT

A method may include determining that a label distribution protocol (LDP) session is not associated with an interface of a network device, wherein the interface of the network device is included in a targeted LDP session. Interior gateway protocol (IGP) metric information for both a physical interface associated with the network device and a forwarding adjacency label switched path (FA-LSP) associated with the targeted LDP (tLDP) session may be configured to each indicate a high cost. The configured metric information may be transmitted to other network devices in a network that includes the LSP and the targeted LDP session to inhibit selection of the targeted LDP session by the other network devices when routing data through the network.

16 Claims, 6 Drawing Sheets

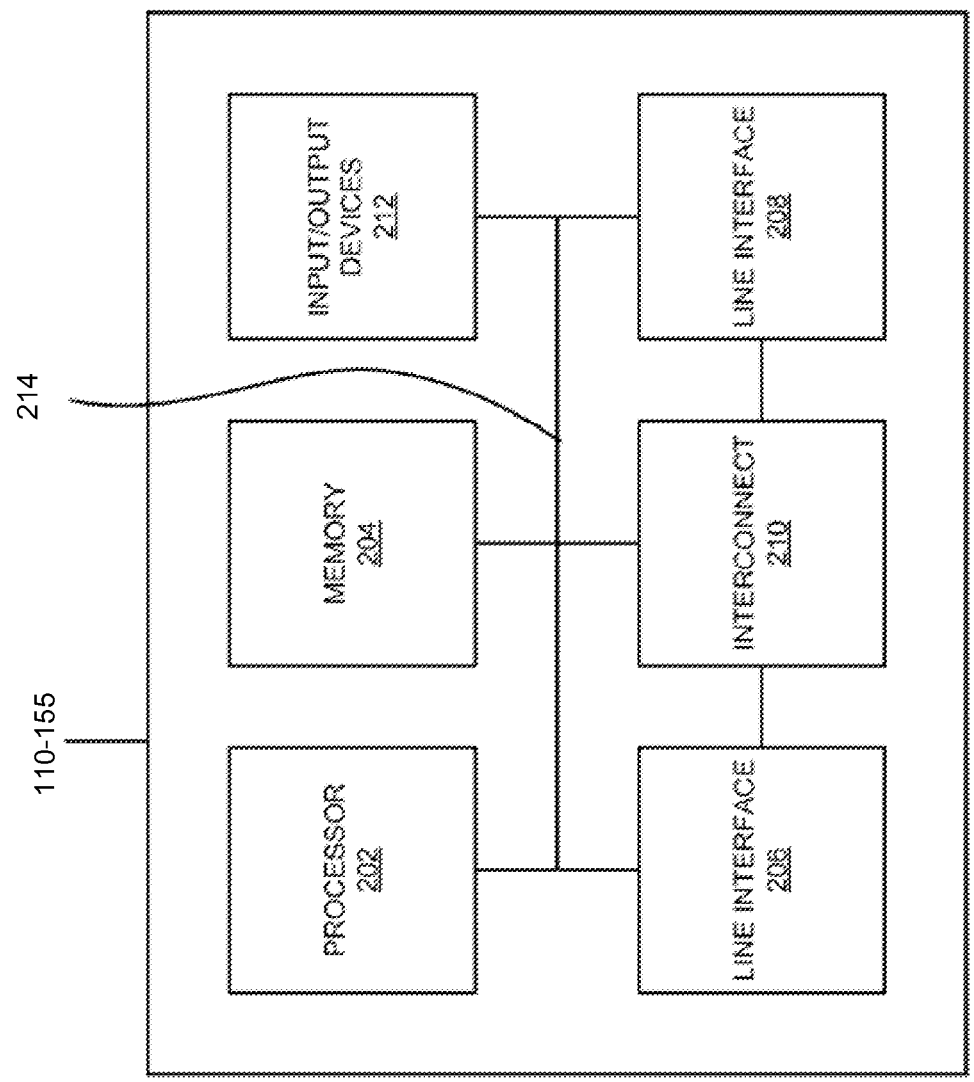

LABEL DISTRIBUTION PROTOCOL SYNCHRONIZATION IN MULTI-PROTOCOL LABEL SWITCHING ENVIRONMENTS

BACKGROUND INFORMATION

Network providers may offer virtual private network (VPN) services to their customers. Using a VPN, a customer may be able to communicate confidential information over a public or shared network, such as the public Internet. A network provider may implement a VPN over a private network using Multi-Protocol Label Switching (MPLS). MPLS is a data carrying protocol that may provide the features of circuit switched networks over a packet switched network in the form of label switched paths (LSPs). MPLS may enable a network to carry many different kinds of traffic, such as Internet protocol (IP) packets, asynchronous transfer mode (ATM) cells, and synchronous optical network (SONET) or Ethernet frames.

BRIEF DESCRIPTION OF THE DRAWINGS

FIG. 2 is an exemplary block diagram of the network devices of FIG. 1A;

DETAILED DESCRIPTION OF PREFERRED EMBODIMENTS

The following detailed description refers to the accompanying drawings. The same reference numbers in different drawings may identify the same or similar elements.

Implementations described herein relate to synchronizing interior gateway protocol (IGP) and label distribution protocol (LDP) sessions on a network device associated with an explicitly formed label switched path (LSP) and a targeted LDP session (e.g., a virtual private network (VPN) service). In one exemplary implementation, a network device may determine that a LDP session has failed or is not active and may configure IGP-related metric information for both a physical interface associated with the network device and a forwarding adjacency label switched path (FA-LSP) associated with the tLDP session to indicate a high cost of using the network device. The metric information may then be transmitted to other network devices in a network that includes the LSP and the targeted LDP session to inhibit selection of the targeted LDP session by the other network devices during route calculations through the network.

Figure 1A:
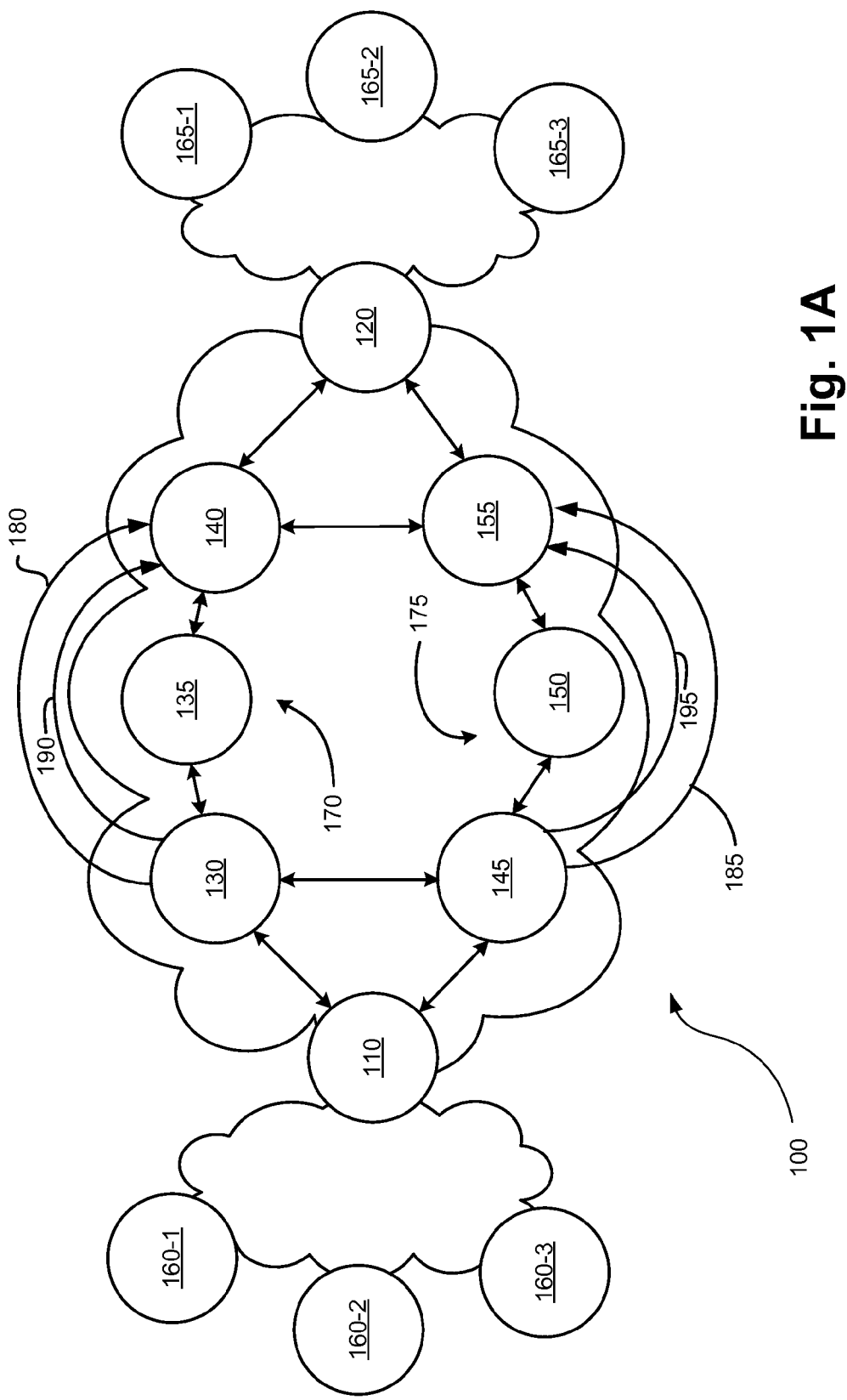
FIG. 1A is a block diagram of an exemplary network in which systems and methods described herein may be implemented.

FIG. 1A is a block diagram of an exemplary network 100 in which systems and methods described herein may be implemented. Network 100 may include network devices 110, 120, 130, 135, 140, 145, 150, and 155, user devices 160-1 through 160-3, referred to collectively as user devices 160, and user devices 165-1 and 165-2, referred to collectively as user devices 165, upper plane 170, lower plane 175, tunnel 180, and tunnel 185.

Network devices 110 and 120 may each include a network node (e.g., a switch, a router, a gateway, etc.) that receives data and routes the data to a destination device. In an exemplary implementation, network devices 110 and 120 may be provider edge (PE) devices that route data received from various devices, such as user devices 160 and 165, using multi-protocol label switching (MPLS) LDP protocol. In this case, network devices 110 and 120 may set up one or more label switching paths (LSPs) via network devices 130-155 in which data forwarding decisions are made using an MPLS label included with a data packet to identify a next hop to which to forward the data. As described briefly above, the LSPs may be configured using LDP signaling messages propagated between devices 110 and 120.

For example, devices in the LSP may receive a data packet that includes an MPLS label in the header of the data packet. The various hops in the LSP may then use the label to identify an output interface on which to forward the data packet without analyzing other portions of the header, such as a destination address.

Network devices 130-155 may include a number of devices (e.g., routers, etc.) that receive data and route the data to next hop devices using MPLS. As described above, in conjunction with PE devices 110 and 120, network devices 130-155 may set up one or more LSPs that form routes between PE devices 110 and 120. In an exemplary implementation, network devices 130-155 may be provider (P) devices (e.g., interior or "core" MPLS devices) configured to route data received from, for example PE devices 110 and/or 120, or neighboring P devices 130-155, using the established LSPs. Furthermore, network devices 130, 140, 145, and 155 may be provider edge (PE) devices with respect to RSVP (resource reservation protocol) tunnels terminated (e.g., beginning or ending) at the respective network devices. Network devices 130, 140, 145, and 155 may perform PE functions by imposing (or removing) RSVP labels on packets corresponding to the RSVP tunnel. Conversely, as illustrated in FIG. 1, network devices 135 and 150 are core P devices, that do not perform label imposition.

As shown in FIG. 1, network devices 130, 135, and 140 may form an "upper" plane 170 between PE devices 110 and 120 and network devices 145, 150, and 155 may form a "lower" plane 175 in "dual plane" redundant MPLS network 100. In such a dual plane network, traffic between PE network devices 110 and 120 may be routed over either upper plane 180 or lower plane 185 depending, for example, on the health or status of the devices on the other plane.

In one implementation, network devices 110 and 120 may form direct LDP neighbor relationships with network devices 130, 145 and 140, 155, respectively. Moreover, as described above, network devices 130 and 145 may form MPLS traffic engineered (TE) tunnels based on the RSVP (resource reservation protocol) TE protocols with network devices 140 and 155, respectively. These RSVP-TE tunnels may include LDP tunneling capability, this capability being referred to as LDP over RSVP.

Using the direct LDP relationships and the LDP over RSVP relationships, LDP may be extended in an end-to-end manner between edge network devices 110 and 120. This may provide an MPLS-enabled core without requiring extension of RSVP to edge devices 110 and 120.

Each of user devices 160-1 through 160-3 may represent user equipment, such as customer premises equipment (CPE), customer edge (CE) devices, switches, routers, computers or other devices coupled to network device 110. User devices 160 may connect to network device 110 via wired, wireless or optical communication mechanisms. For example, user devices 160 may connect to network device 110 via a layer 2 network (e.g., an Ethernet network), point-to-point links, the public switched telephone network (PSTN), a wireless network, the Internet, or some other mechanism.

Similarly, each of user devices 165-1 through 165-3 may represent user equipment similar to user devices 160. That is, user devices 165 may include routers, switches, CPE, CE devices, computers, etc. User devices 165 may connect to network device 120 using wired, wireless or optical communication mechanisms.

Figure 1B:
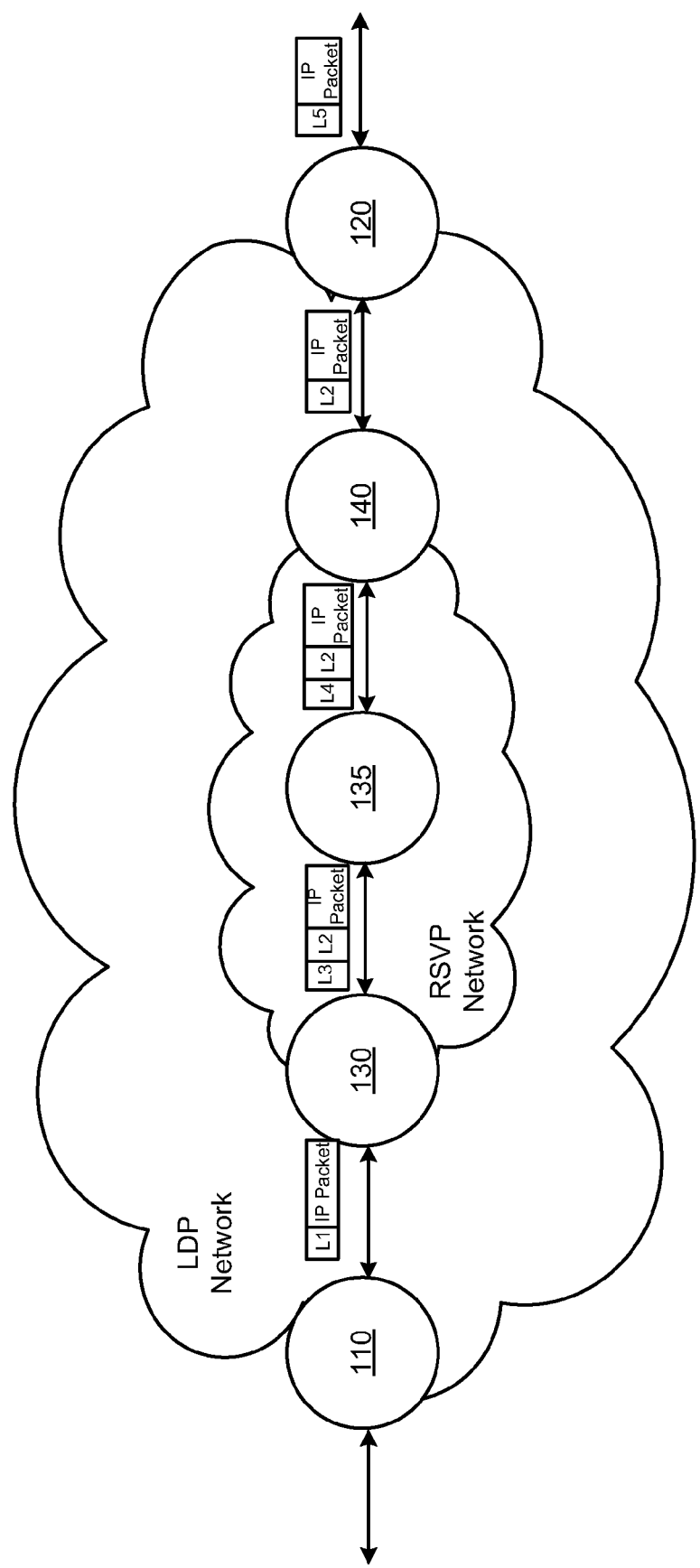
FIG. 1B is a block diagram illustrating a portion of the network of FIG. 1A

FIG. 1B illustrates a portion of network 100. As illustrated, network devices 110-120 may implement MPLS to enable efficient routing of packets between network devices. For example, network device 110 may use LDP label L1 to represent and distinguish between different customer VPN(s) at the ingress of network 100. For example, assume that network device 110 is the ingress edge device. Upon entry into core network at network device 130, LDP label L1 may be swapped with LDP label L2. In addition, a label L3 may be pushed onto the packet, with label 3 relating to the VPN (e.g., an LDP tunnel between network device 130 and network device 140). New outer label L4 may be swapped with outer label L3 at network device 135. At network device 140 (the end of the LDP tunnel), outer label L4 may be popped, leaving LDP label L2. At the egress of core network, LDP label L2 may be swapped into label L5 by egress device 120. Although described above in relation to a path through network 100 from device 110 to device 120, similar label swapping may take place in a reverse order (e.g., from device 120 to device 11), for an LSP having a reverse direction.

The receiving edge network device 110 or 120 may identify the specific customer VPN associated with the received packet based on the LDP label applied to the received packet, would strip or "pop" the label, and may forward the VPN traffic to the proper interface for that specific customer VPN to devices 160-1 through 160-3 or 165-1 through 165-3.

The various hops forming the RSVP-based LSP in the network core may then use the RSVP-TE based labels to identify an output interface on which to forward the data packet without analyzing other portions of the header, such as a destination address using labels L3 and L4 by devices 130-155.

In one exemplary implementation, at least some of network devices 110-155 may be configured to be compliant with MPLS traffic engineering protocols (e.g., RSVP-TE, as described above). Traffic engineering or "TE," refers generally to the capability of explicitly structuring paths (e.g., LSPs) or routes through the network based on various constraints, such as bandwidth, etc., in order to better balance a load placed on a particular network. In this implementation, during LSP establishment, targeted label distribution protocol (tLDP) may be used to establish targeted LDP (tLDP) sessions between non-directly connected peer devices.

For example, in establishing a traditional LSP (i.e., between directly connected peers) in a network of connected devices, network devices (e.g., a label switching routers (LSRs)) running LDP typically transmit, on a periodic basis, hello messages to all connected peer devices. The hello messages are typically multicast UDP (user datagram protocol) messages transmitted to a known LDP discovery port. Upon receipt of a hello message on a link, a hello adjacency is established between the receiving device and the device that transmitted the hello message. Based on the TLV (type-length-value) information included in the exchanged hello messages, a LDP session may be established between the peer devices.

For non-directly connected network devices (e.g., devices 130 and 140 in upper plane 170 and network devices 145 and 155 in lower plane 175), targeted LDP may be used to transmit targeted hello messages from an initiating device to the non-directly connected peer, using, e.g., a network address (e.g., an IP address) associated with the non-directly connected peer. Targeted hello messages typically include a hold time value, the expiration of which implies to the LDP peer that the tLDP session should be terminated. Upon receipt of a targeted hello message, the receiving device may establish a targeted hello adjacency with the non-directly connected peer by transmitting a targeted hello message back to the original sending device.

Once targeted hello adjacencies have been established between the two non-directly connected devices, a targeted LDP session may be established. Targeted LDP session establishment includes transport connection establishment and session initialization. Transport connection establishment creates a TCP (transport control protocol) connection between the two peer devices. After creation of the TCP connection, session establishment proceeds to the session initialization phase. In this phase, the tLDP peer devices (e.g., network devices 130 and 140 in upper plane 170) exchange and negotiate session parameters such as the protocol version, label distribution methods, hold time values, label ranges, and so on.

Although not limited thereto, targeted LDP is particularly useful in establishing LDP sessions between ingress and egress devices over an RSVP TE tunnel suitable for establishing a virtual private network (VPN).

To illustrate this concept, network 100 may include an RSVP tunnel 180 established via an RSVP session formed between ingress network device 130 and egress network device 140 and an RSVP tunnel 185 established via an RSVP session formed between ingress network device 145 and egress network device 155. Upon establishment of RSVP tunnels 180/185, tLDP sessions 190 and 195 may be established associated with the respective RSVP tunnels.

Please note that references to "ingress" and "egress" devices are arbitrary and are merely used to illustrate that RSVP tunnels, LSPs, and tLDP sessions in MPLS embodiments are unidirectional mechanisms, both in relation to tLDP sessions 190 and 195 and to PE network devices 110 and 120. In typical implementations, networks are configured to include pairs of oppositely configured devices.

In conventional IP-based routing (i.e., non-MPLS based routing), an interior gateway protocol (IGP), such as open shortest path first (OSPF) or intermediate system to intermediate system (ISIS) running on each connected network device (e.g., devices 130 and 140) may enable the devices to periodically and routinely flood the network with information about itself, while simultaneously receiving network topology information from other network devices. IGP then determines (using, e.g., a link-state algorithm, such as the shortest path first (SPF) algorithm) the various routes through a network to various destination devices (e.g., egress PE devices) based on the received information. These routes are stored in a routing table or database on each network device along with a metric or score associated with each route. This metric may be referred to as the IGP interface (i.e., physical link) metric for a given path or route and may include a combined cost of each link in the route.

As an example, assume a first route to a destination includes three links, where each link has an IGP interface metric of 10, resulting in a route metric of 30, while a second route to the destination also includes three (potentially different) links, but where the first link in the second route has an IGP interface metric of 5 and the other two links include IGP metrics of 10, for a total route IGP interface metric of 25. In this scenario, a route calculating device (e.g., a provider edge router) confronted with these values would typically select the second route, since it has a lower router IGP interface metric and is therefore typically viewed as more reliable and/or faster.

The IP-related routing information collected and exchanged via IGP may also be used in the formation of MPLS-based RSVP, LDP, or tLDP sessions. For example, a network device (e.g., network device 110) establishing an LDP peering relationship via device IP addresses associated with the respective network devices (e.g., loopback addresses of the included devices) may determine how to reach the destination loopback address through the next-hop interface via IGP.

As described briefly above, in some situations, the network service provider may prefer to route traffic over an MPLS-based RSVP session (e.g., RSVP tunnel 180), rather than using the shortest path IGP metric. This may be referred to as MPLS-TE Forwarding Adjacencies (FA-LSP). In this case, information regarding the RSVP tunnel (e.g., RSVP tunnel 180) may be injected as an entry into the IGP routing database as another direct link, such that other IGP devices in network 100 see RSVP tunnels 180 and 185 as links directly connecting their respective RSVP session ingress and egress devices (e.g., network devices 130 and 140 for RSVP tunnel 180 and network devices 145 and 155 for RSVP tunnel 185). The FA-LSP may be configured with a metric that is used by the IGP for calculating the best path between regular links and FA-LSP based links. In making a routing decision between an IGP route (i.e., an IP-based route) and an MPLS LSP, a calculating device may compare relative IGP interface and the IGP FA-LSP metrics, respectively.

The exemplary configuration illustrated in FIG. 1A is provided for simplicity. It should be understood that a typical network may include more or fewer devices than illustrated in FIG. 1A. For example, network 100 may include a larger number of network devices positioned between PE devices 110 and 120 in a core of network 100.

FIG. 2 illustrates an exemplary block diagram of PE devices 110/120, P devices 130-155, and user devices 160/165 of FIG. 1A, hereinafter referred to as network devices 110-165." Each of network devices 110-165 may include a processor 202, a memory 204, line interfaces 206 and 208, an interconnect 210, input/output devices 212, and a bus 214.

Processor 202 may include one or more processors, microprocessors, application specific integrated circuits (ASICs), field programmable gate arrays (FPGAs), and/or processing logic optimized for networking and communications. Processor 202 may process packets and/or network path-related information. Memory 204 may include static memory, such as read only memory (ROM), dynamic memory, such as random access memory (RAM), and/or onboard cache, for storing data and machine-readable instructions. Memory 204 may also include storage devices, such as a floppy disk, a CD ROM, a CD read/write (R/W) disc, and/or flash memory, as well as other types of storage devices. Line interfaces 206 and 208 may include devices for receiving incoming packets from networks and for transmitting packets to networks. Interconnect 210 may include switches or other logic for conveying an incoming packet from line interface 206 to line interface 208 based on a packet destination and stored path information. Examples of interconnect 210 may include a communication bus or a switch fabric. Input/output devices 212 may include a display console, keyboard, mouse, and/or other types of devices for converting physical events or phenomena to and/or from digital signals that pertain to network devices 110-165. Input/output devices 212 may allow a user or a network administrator to interact with network devices 110-165 (e.g., configure network devices 110-165). Bus 214 may include a path that permits communication among components of each of network devices 110-165.

Figure 3:
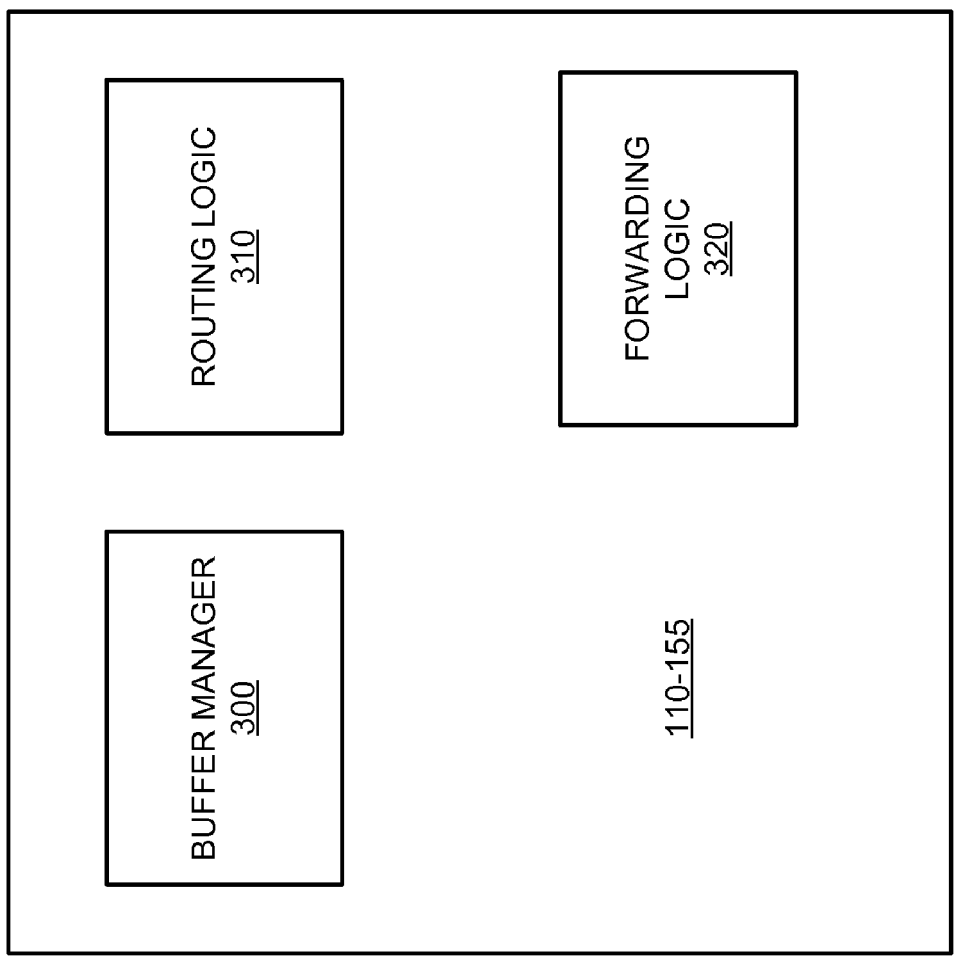
FIG. 3 is an exemplary functional block diagram of components that may be included in each of the network devices of FIG. 1A.

FIG. 3 is an exemplary functional block diagram of components that may be included in each of network devices 110-155. As shown, each of network devices 110-155 may include a buffer manager 300, routing logic 310, and forwarding logic 320. Buffer manager 300 may provide a buffer for queuing incoming packets. If packets arrive simultaneously, one or more of the packets may wait in the buffer until higher priority packets are processed and/or transmitted. Routing logic 310 may include hardware and/or software for communicating with other routers to gather and store routing information in a routing information base. Forwarding logic 320 may include hardware and/or software for directing a packet to a proper output port on line interface 208 based on the routing information.

Figure 4:
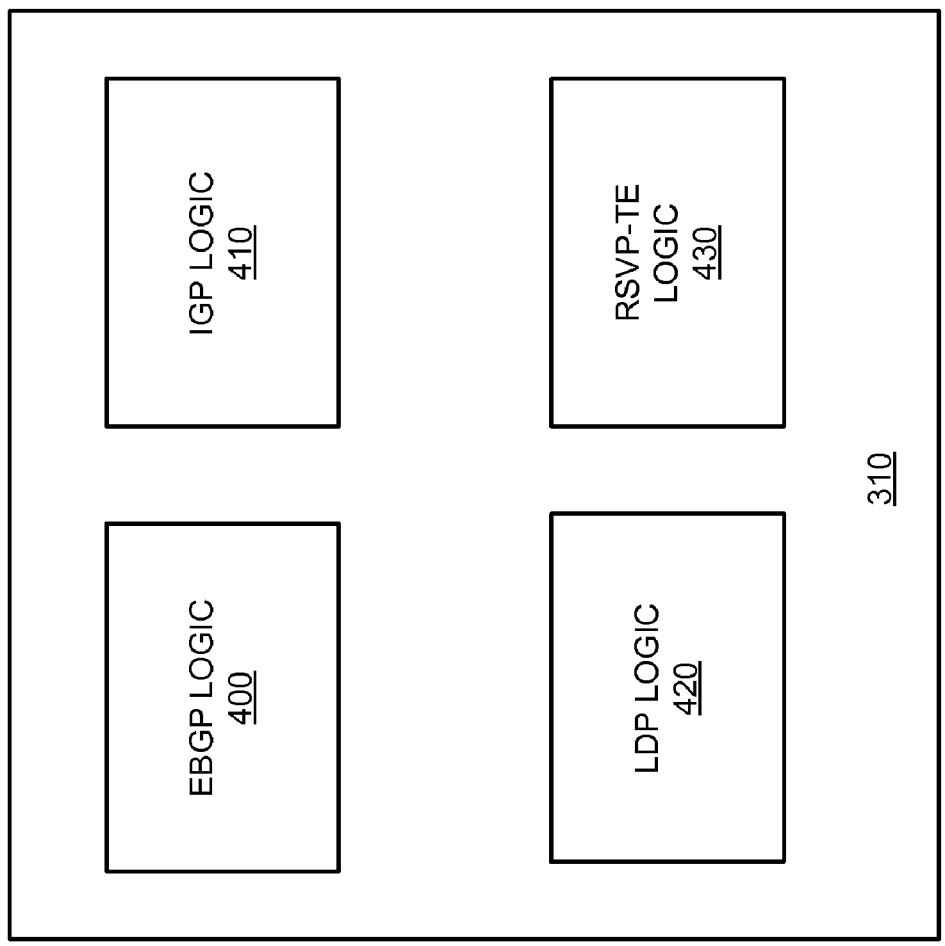
FIG. 4 shows an exemplary functional block diagram of one implementation of the routing logic of FIG. 3.

FIG. 4 shows an exemplary functional block diagram of one implementation of routing logic 310. As illustrated, routing logic 310 may include External Border Gateway Protocol logic (EBGP) logic 400, IGP logic 410, and LDP logic 420, and RSVP-TE logic 430. In different implementations, routing logic 310 in network devices 110-155 may include additional, fewer, or different components than those illustrated in FIG. 4. For example, in one implementation, routing logic 310 may include logic that may determine network paths based on constraints related to quality of service (QoS).

EBGP logic 400 may include hardware and/or software for maintaining and/or updating routing tables based on EBGP. In general, EBGP may be used by gateway hosts (e.g., PE devices 110 and 120) in a network (e.g., network 100) of autonomous systems (i.e., networks that are governed by a common set of network policies) to maintain and update paths in routing tables. Each of the routing tables may include, for each destination, information about paths to reach the destination, and each of the paths may include addresses of gateway hosts that a packet may visit to reach the destination. The gateway hosts may maintain and update the routing table by exchanging routing information.

IGP logic 410 may include hardware and/or software for maintaining and/or updating routing tables based one of many possible routing protocols. The possible routing protocols, for example, may be either a distance-vector type or a link-state type. In distance-vector type protocols, each router may populate its routing tables by using information about local interconnections. Examples of distance-vector routing protocol may include Routing Information Protocol (RIP), Interior Gateway Routing Protocol (IGRP), or Enhanced Interior Gateway Routing Protocol (EIGRP).

In link-state type protocols, such as those described in detail above, each router may possess information about a complete network topology, and may compute paths based on both the complete network topology and local connection information. IGP logic 410 may compute the shortest paths to other networks or destinations based on, for example, cost metrics associated with the various identified links. To adjust for changes in a network, IGP logic 410 may send hello packets to other routers and may exchange network path information with other routers whenever there is a change in the network. Examples of link-state type protocols may include OSPF and IS-IS.

LDP logic 420 may include hardware and/or software for sharing labels (i.e., network addresses or identifiers of devices in a MPLS network) with other network devices within an MPLS network in accordance with label distribution protocol. LDP logic 420 may enforce a specific set of procedures (i.e., LDP protocol) for exchanging messages (e.g., LDP messages) about labels. Through the exchange of LDP messages, a label information base (LIB) of each device in network 100 may be populated with routing and label information. This may be referred to as "label binding." RSVP-TE logic 320 may include hardware and/or software for establishing RSVP tunnels (e.g., RSVP tunnels 180 and 185) between RSVP devices.

The above description provides a general understanding of an MPLS network (e.g., network 100) and associated devices (e.g., network devices 110-165) configured to support LSPs configured via LDP and targeted LDP, and to support FA-LSPs. Having established the underlying network and systems, it has been determined that data or packets transmitted via network 100 may suffer losses due to a disruption in synchronization between IGP establishment (i.e., the exchange of link state information among other devices and the establishment of a comprehensive routing table) and LDP establishment (i.e., the exchange of LDP hello messages and the establishment of an LDP session between identified hello adjacencies).

For example, in the event that LDP fails on a network device (e.g., network device 140 in network 100), while IGP remains operational on the device, other network devices in the network (e.g., network 100), may continue to "see" network device 140 due to IGP on network device 140 continuing to flood network 100 with IP-related link state information. LDP may fail or become inoperable due to various factors, such as the device's MPLS control plane going down, operator configuration error, stale or obsolete LDP labels, software bugs or LDP implementation, timing error between IGP setup and LDP setup, etc. Because LDP is non-operational, MPLS traffic forwarded to device 140 will not be properly handled and will be dropped or "black holed." The LDP failure may be caused by MPLS control plane failure in the device, device misconfiguration, etc.

TLDP sessions (e.g., tLDP sessions 190 and 195) may likewise fail to operate in the event that LDP is lost on a network device included in RSVP tunnel 180 (e.g., network device 140). In one implementation consistent with embodiments described herein, IGP logic 410 may be configured to modify metric information associated with the failed targeted LDP session (e.g., the IGP FA-LSP metric and the IGP interface metric for the interface associated with the tLDP session 190), in the event that LDP becomes non-operational on a network device (e.g., device 140). For example, assuming that LDP has failed on network device 140 (e.g., LDP logic 420 has lost label binding with other devices in network 100), IGP logic 410 may be configured to protect against data loss by automatically setting the IGP interface metric associated with the interface or link corresponding the failed LDP to a high value (e.g., the ISIS metric in the case of ISIS IGP implementation), while simultaneously also setting the IGP FA-LSP metric associated with the IGP forwarding adjacency to a high value. As described above, the IGP FA-LSP relates to propagating information regarding an RSVP tunnel (e.g., RSVP tunnel 180) as another direct link in an LSP based on a tLDP session.

These configured metric values may then be flooded to other network devices as part of the operation of IGP logic 410. Given the high values assigned to the IGP interface metric and the IGP FA-LSP metric, other network devices in network 100 will not likely route traffic via tunnel 180. Upon re-establishment of LDP on network device 140, the IGP interface and IGP FA-LSP metric values may be returned to their typical values, thus effectively re-enabling use of the FA-LSP in making routing decisions in network 100.

Figure 5:
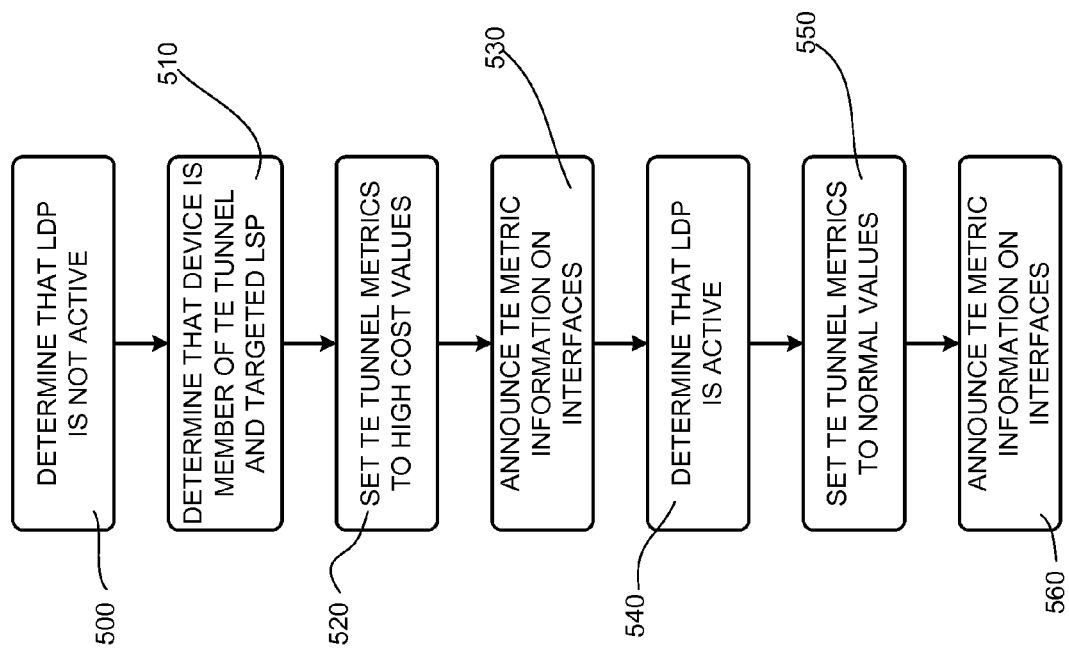
FIG. 5 is a flow diagram illustrating exemplary processing associated with providing IGP/LDP synchronization in the network of FIG. 1A.

FIG. 5 is a flow diagram illustrating exemplary processing associated with providing IGP/LDP synchronization in network 100. For the purposes of FIG. 5, assume that LDP has failed on network device 140 and that network device 140 is an egress device in RSVP tunnel 180 used in targeted LDP session 190. Processing may begin with IGP logic 410 determining that an LDP session is not active on network device 140 (block 500). For example, as described above, LDP logic 420 may establish LDP sessions for use in creating LSPs by exchanging hello messages and configuration information with neighboring or adjacent network devices.

In one implementation, determining that an LDP session is not active may occur upon initiating IGP at device startup. During device startup, it may be known that LDP session establishment lags IGP setup by a predetermined amount of time. In other implementations, IGP logic 410 may determine that LDP has failed or is unavailable in other ways. For example, LDP logic 420 may notify IGP logic 410 that one or more hello adjacencies associated with an LSP have not been received in with the defined hold time window (described briefly above) or that LDP is misconfigured on the device.

When it is determined that LDP has failed or is otherwise unavailable, IGP logic 410 may determine that network device 140 is a member of tLDP session 190 (block 510). As described above, unlike typical LDP session establishment, targeted LDP sessions are not established using IP-based SPF calculations. Rather, a path or route through a network is explicitly configured through targeted hello messages exchanged between designated peer devices. Typically, these devices are not directly connected, such as network device 130 and network device 140. When forwarding adjacency (FA-LSP) is enabled on network device 140 to announce or advertise the existence of an ingress to RSVP tunnel 180 as a link to peer devices on network 100 (e.g., network device 110), the upstream network devices may be unaware of the tunnel failure upon receipt of IGP information from network device 140.

In order to prevent MPLS traffic flow through network device 140 when LDP is not active, IGP logic 410 may be configured to set IGP interface metric information corresponding to the failed LDP links to high cost values (block 520). As described above, each link or interface associated with a network device (e.g., network device 140) may be assigned an IGP (e.g., ISIS or OSPF) interface metric value relating to the "cost" or desirability of traversing the link in network 100. When deciding how to route data, a route calculating device may identify available routes from a routing table compiled from received IGP information. Each route in the routing table typically includes a cost or other measure calculated based on the combined IGP interface metric values for each link in the route.

To ensure that traffic does not travel over tLDP session 190 in the event of an LDP failure on network device 140, IGP logic 410 may be configured to set a metric associated with the announced FA-LSP (e.g., the IGP FA-LSP metric) to a high cost level. In an OSPF IGP implementation, these costs are set to LSInfinity (having a 16-bit value 0xFFFF). In an ISIS IGP implementation, the costs are set to $2^{24-2}$ (with a 16-bit value of 0xFFFFFE).

Once the metric values have been set, IGP logic 410 may announce or broadcast the IGP information on all interfaces (e.g., line interfaces 206 and 208) (block 530). Routing decisions made upstream from network device 140, in view of the high IGP interface metric associated with the failed LDP interface as well as the high metric associated with the announced IGP FA-LSP and may, instead, route traffic through, for example, lower plane 175.

IGP logic 410 may then determine that LDP is operational on network device 140 (block 540). For example, IGP logic 410 may receive a signal or notification from LDP logic 420 indicating the operational state of LDP on network device 140 is functioning properly. IGP logic 410 may return the IGP interface and IGP FA-LSP metric information to normal operational cost values (block 550). IGP logic 410 may announce or broadcast the updated IGP information on all interfaces (e.g., line interfaces 206 and 208) (block 560), and routing via RSVP tunnel 180/tLDP session 190 may proceed. Once metric values are returned to "normal," routing decisions at upstream devices may be made based on the costs associated with identified paths or routes, with paths or routes having lower costs being typically selected over routes or paths having higher costs.

In another implementation, rather than receiving an indication of LDP operational state, IGP logic 410 may be configured to initiate a timer corresponding to estimated LDP configuration times. Upon expiration of the timer, it may be assumed that LDP is active and the IGP FA-LSP and IGP interface metric information may be updated.

The above-described systems and methods provide a mechanism for preventing or reducing data loss in a traffic engineered tunnel MPLS environment, by rendering routes or paths that include the tunnel to be unattractive in the event of an LDP failure. Upon reestablishment of LDP, the routes or paths that include the tunnel may be returned to normal, thereby enabling traffic flow over the tunnel.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIG. 5, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

determining, upon initiation of an interior gateway protocol (IGP) at a network device, that a label distribution protocol (LDP) session is not associated with the network device, wherein the network device is included in a targeted LDP (tLDP) session;

configuring IGP metric information, for both a physical interface and a forwarding adjacency label switched path (FA-LSP) associated with the network device and the tLDP session, to maximum values available based on the IGP associated with a distance-vector type or a link-state type routing protocol used by the network device, to each indicate a high cost corresponding to a time period related to relative setup times for the IGP and the LDP session; and transmitting the configured metric information to other network devices, in a network that includes the FA-LSP and the tLDP session, to inhibit, for the time period, selection of the tLDP session by the other network devices when routing data through the network.

2. The method of claim 1, wherein the network device comprises a tLDP session egress network device or a tLDP session ingress network device.

3. The method of claim 1, wherein determining that an LDP session is not associated with the network device further comprises:

determining that one or more hello adjacencies associated with the tLDP session has not been received within the time period.

4. The method of claim 1, wherein the tLDP session is announced to the other network devices over the FA-LSP.

5. The method of claim 4, wherein the IGP FA-LSP metric information comprises a maximum metric associated with the IGP.

6. The method of claim 1, wherein the routing protocol comprises a link-state type, the method further comprising:

setting each of the IGP interface metric information and the IGP FA-LSP metric information to LSInfinity when the IGP associated with the network device comprises Open Shortest Path First (OSPF), or setting each of the IGP interface metric information and the IGP FA-LSP metric information to $2^{24-2}$ when the IGP associated with the network device comprises Intermediate System-to-Intermediate System (ISIS).

7. The method of claim 1, wherein transmitting the configured metric information further comprises transmitting the configured metric information via the IGP on all interfaces associated with the network device.

8. The method of claim 1, further comprising:

determining that the LDP session has been established;

reconfiguring the IGP interface metric information and the IGP FA-LSP metric information to each indicate a normal cost; and transmitting the reconfigured metric information to the other network devices in the network to enable selection of the tLDP session by the other network devices when routing data through the network.

9. A network device, comprising:

an ingress interface for receiving incoming packets from a label switching network;

an egress interface for transmitting packets to the network, wherein the label switching network includes a targeted label distribution protocol (tLDP) session configured over a resource reservation protocol (RSVP) label switched path (LSP); and logic configured to:
- determine, upon establishment of an interior gateway protocol (IGP) at the network device, that a label distribution protocol (LDP) session is not associated with the network device;
- configure IGP metric information, for both a physical interface and a forwarding adjacency label switched path (FA-LSP) associated with the network device and the tLDP session, to each indicate a maximum value available, based on the IGP associated with a distance-vector type or a link-state type routing protocol used by the network device, corresponding to a setup time for the IGP relative to a setup time for the LDP session; and
- transmit the configured IGP interface and FA-LSP metric information to other network devices in the network via the ingress and egress interfaces to inhibit, during the setup time, selection of the tLDP session by the other network devices when routing data through the network.

10. The network device of claim 9, wherein the network device comprises a provider edge (PE) router positioned at an ingress or egress to the tLDP session.

11. The network device of claim 9, wherein the tLDP session is announced to the other network devices over the forwarding adjacency label switched path (FA-LSP).

12. The network device of claim 9, wherein the logic to configure IGP interface metric information and FA-LSP metric information to each indicate a high value, further comprises:
- setting each of the IGP interface metric information and the IGP FA-LSP metric information to LSInfinity when the IGP associated with the network device comprises Open Shortest Path First (OSPF), or
- setting each of the IGP interface metric information and the IGP FA-LSP metric information to $2^{24-2}$ when the IGP associated with the network device comprises Intermediate System-to-Intermediate System (ISIS).

13. The network device of claim 9, wherein the logic is further configured to:
- determine that the LDP session has been established;
- reconfigure the IGP interface metric information and the IGP FA-LSP metric information to each indicate a normal cost; and
- transmit the reconfigured metric information to the other network devices in the network to enable selection of the tLDP session by the other network devices when routing data through the network.

14. A non-transitory computer-readable medium having stored thereon sequences of instructions which, when executed by at least one processor, cause the at least one processor to:
- determine, upon setup of an interior gateway protocol (IGP) at a network device, that a label distribution protocol (LDP) session is not associated with the network device, wherein the network device is included in a targeted LDP (tLDP) session configured over a resource reservation protocol (RSVP) label switched path (LSP);
- configure IGP metric information for both a physical interface and a forwarding adjacency label switched path (FA-LSP) associated with the network device and the tLDP session, to maximum values available based on the IGP associated with a distance-vector type or a link-state type routing protocol used by the network device, to each indicate an undesirable path corresponding to a time period with respect to setup times for the IGP and the LDP session; and
- forward the configured metric information to other network devices in a network via ingress and egress interfaces to inhibit, for the time period, selection of the tLDP session by the other network devices when routing data through the network.

15. The non-transitory computer-readable medium of claim 14, further including instructions for causing the at least one processor to:
- determine that the LDP session has been established;
- reconfigure the IGP interface metric information and the IGP FA-LSP metric information to each indicate a normal cost; and
- forward the reconfigured metric information to the other network devices in the network to enable selection of the tLDP session by the other network devices when routing data through the network.

16. The non-transitory computer-readable medium of claim 15, wherein the instructions for determining that the LDP session has been established further include instructions for causing the at least one processor to:
- determine that the LDP session is no longer associated with the network device;
- start a timer when it is determined that the LDP session is no longer associated with the network device; and
- determine that the LDP session has been established upon expiration of the timer.

* * * * *